United States Patent [19]

Arai et al.

[11] Patent Number: 4,531,420
[45] Date of Patent: Jul. 30, 1985

[54] ROTARY SHAFT OF TRANSMISSION

[75] Inventors: Hajime Arai, Aichi; Shozi Haga; Tadashi Nozaki, both of Toyota, all of Japan

[73] Assignee: Toyota Jidosha Kabushiki Kaisha, Toyota City, Japan

[21] Appl. No.: 454,457

[22] Filed: Dec. 29, 1982

[51] Int. Cl.³ .................... F16H 57/04; B21D 53/12; B21H 1/14; B21K 1/02

[52] U.S. Cl. .................. 74/467; 29/148.4 L; 464/14; 464/183

[58] Field of Search ............ 74/467; 29/148.4 L, 29/148.4 S, 148.4 A, 148.4 C, 148.4 D; 308/187.1; 464/13, 14, 183

[56] References Cited

U.S. PATENT DOCUMENTS

| | | | |
|---|---|---|---|
| 3,101,010 | 8/1963 | Popovich | 74/467 |
| 3,178,907 | 4/1965 | Lyons | 29/148.4 S |
| 3,721,110 | 3/1973 | Borneman | 464/14 |
| 3,798,926 | 3/1974 | Weible | 464/14 |
| 3,832,865 | 9/1974 | Lewis | 464/14 |
| 4,154,490 | 5/1979 | Kohler et al. | 308/187.2 |
| 4,327,598 | 5/1982 | Yoneda et al. | 74/467 |

Primary Examiner—Lawrence J. Staab
Assistant Examiner—M. D. J. Bednarek
Attorney, Agent, or Firm—Finnegan, Henderson, Farabow, Garrett & Dunner

[57] ABSTRACT

A rotary shaft having a bearing surface and an oil seal surface formed close to each other at a portion of a shaft body rotatably mounted in a case of a transmission, wherein a groove is circumferentially formed on the periphery of the shaft body between the bearing surface and the oil seal surface before each of the surfaces is finished, so that the bearing surface and the oil seal surface can be finished so as to be suitable for their respective functions.

1 Claim, 2 Drawing Figures

ROTARY SHAFT OF TRANSMISSION

BACKGROUND OF THE INVENTION

1. Field of the Invention

The present invention relates to a rotary shaft of a transmission.

2. Description of the Prior Art

In a typical conventional rotary shaft having at a portion of its shaft body a bearing surface and an oil seal surface formed close to each other, the bearing surface and the oil seal surface are often formed on one and the same surface, having a mutual finished surface. In consequence, if the mutual surface is superfinished so as to be suitable for the bearing surface, an oil film may break at the contact area between the superfinished surface and an oil seal and consequently, deterioration due to heat at the oil seal lip part may cause oil leakage. On the other hand, if the mutual surface is abrasive-finished so as to be suitable for the oil seal surface, there may be deterioration in the contact conditions between the abrasive-finished surface and bearing rollers, resulting in an unsatisfactory rotational performance of the rollers. Moreover, if one and the same surface is separately finished so as to be suitable for both the surfaces, such a problem may arise that the boundary between the bearing surface and the oil seal surface has a mottled finished portion.

SUMMARY OF THE INVENTION

It is, therefore, an object of the present invention to provide a rotary shaft capable of having a bearing surface and an oil seal surface each finished suitably for the function thereof, thereby improving the rotational performance of the shaft by means of bearing rollers and the sealing performance by means of an oil seal.

BRIEF DESCRIPTION OF THE DRAWINGS

The following drawings illustrate a preferred embodiment of the invention, in which.

DESCRIPTION OF THE PREFERRED EMBODIMENT

Figure 1:
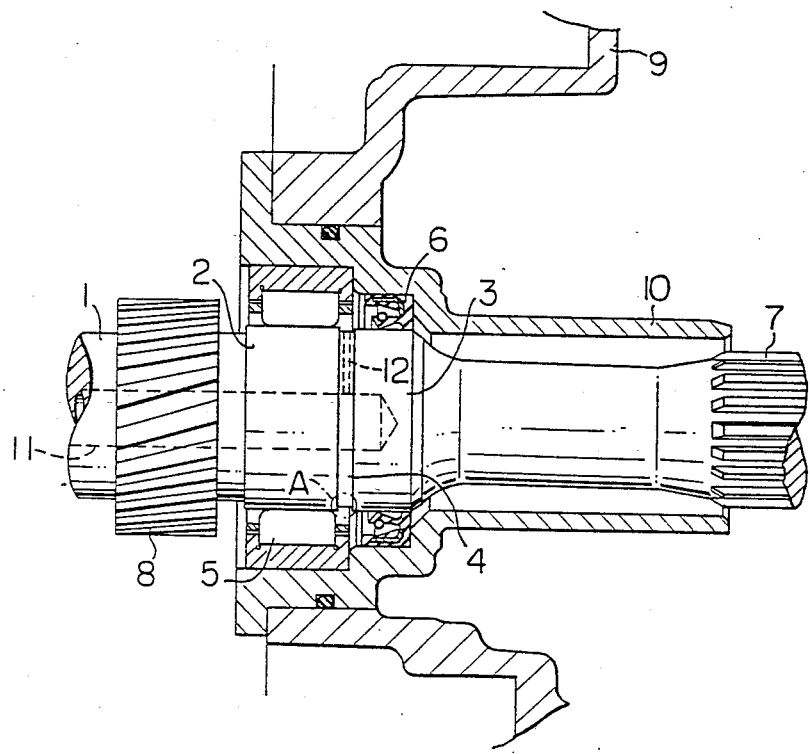
FIG. 1 is a sectional view of an essential part of a rotary shaft of a transmission according to the invention in the state where the rotary shaft is mounted in a case.
Figure 2:
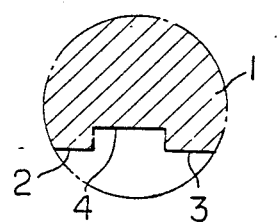
FIG. 2 is an enlarged sectional view of a part A of FIG. 1.

A preferred embodiment of the invention will be described herein with reference to the accompanying drawings. FIG. 1 shows an input shaft as a rotary shaft in the state where it is rotatably mounted in a case. In the Figure, a shaft body 1 has at a portion thereof a bearing surface 2 and an oil seal surface 3 formed close to each other. A groove 4 is circumferentially formed on the periphery of the shaft body 1 between the bearing surface 2 and the oil seal surface 3 before both the surfaces 2, 3 are finished (see FIG. 2). The finished bearing surface 2 is rotatably supported by a bearing 5, while the oil seal surface 3 is sealed with an oil seal 6. Moreover, an oil groove 11 formed inside the shaft body 1 and the groove 4 are allowed to communicate with each other through a communication hole 12 so that the oil in the oil groove 11 can flow to the back side (the right-hand side as viewed in FIG. 1) of the bearing 5 through the communication hole 12. It is to be noted that, in FIG. 1, a spline part 7 is formed at an end of the shaft body 1 so as to mate with a disk hub of a clutch, not shown. Moreover, a first-speed gear 8 is formed close to the bearing surface 2 of the shaft body 1. A reference numeral 9 denotes a transmission case, while a numeral 10 denotes a bearing retainer.

In the above-described rotary shaft, the bearing surface 2 is superfinished so as to be suitable for the function thereof, while the oil seal surface 3 is abrasive-finished so as to be suitable for the function thereof. Since the groove 4 is previously formed between the bearing surface 2 and the oil seal surface 3, there is no possibility of production of any mottled finished portion which is conventionally produced when one and the same surface is separately finished. Accordingly, the bearing surface 2 and the oil seal surface 3 can be finished so as to be suitable for their respective functions.

It is to be noted that although the input shaft has been taken as an example of the rotary shaft in the above-described embodiment, the rotary shaft may be a counter shaft or an output shaft.

As will be understood that the foregoing description, according to the invention, the groove formed between the bearing surface and the oil seal surface allows the surfaces to be separately finished and yet the finished surfaces to be appropriate for their respective functions. Accordingly, it is possible to improve the rotational performance of the shaft by means of the bearing surface and the sealing performance by means of the oil seal surface.

Although only one embodiment of the invention has been disclosed and described, it is apparent that other embodiments and modifications of the invention are possible.

What is claimed is:

1. A rotary shaft having a bearing surface and an oil seal surface formed close to each other at a portion of a shaft body rotatably mounted in a case of a transmission, wherein a groove is circumferentially formed in said shaft body between said bearing surface which is super-finished and said oil seal surface which is abrasive-finished, to positively border between said bearing surface and said oil seal surface, and said shaft has an oil bore formed axially thereof in fluid communication with said circumferential groove.

* * * * *